March 8, 1938.  L. J. WILSON  2,110,517
ANIMAL TRAP
Filed Aug. 20, 1936
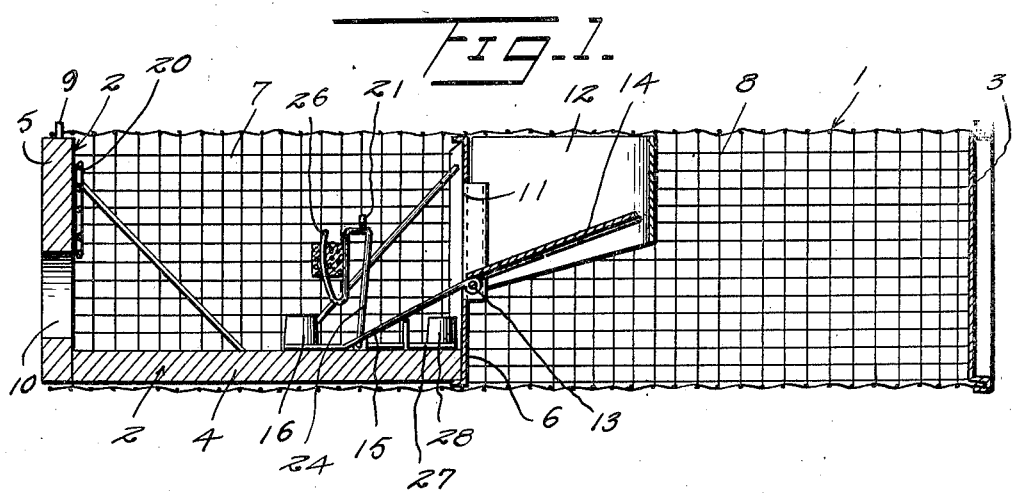
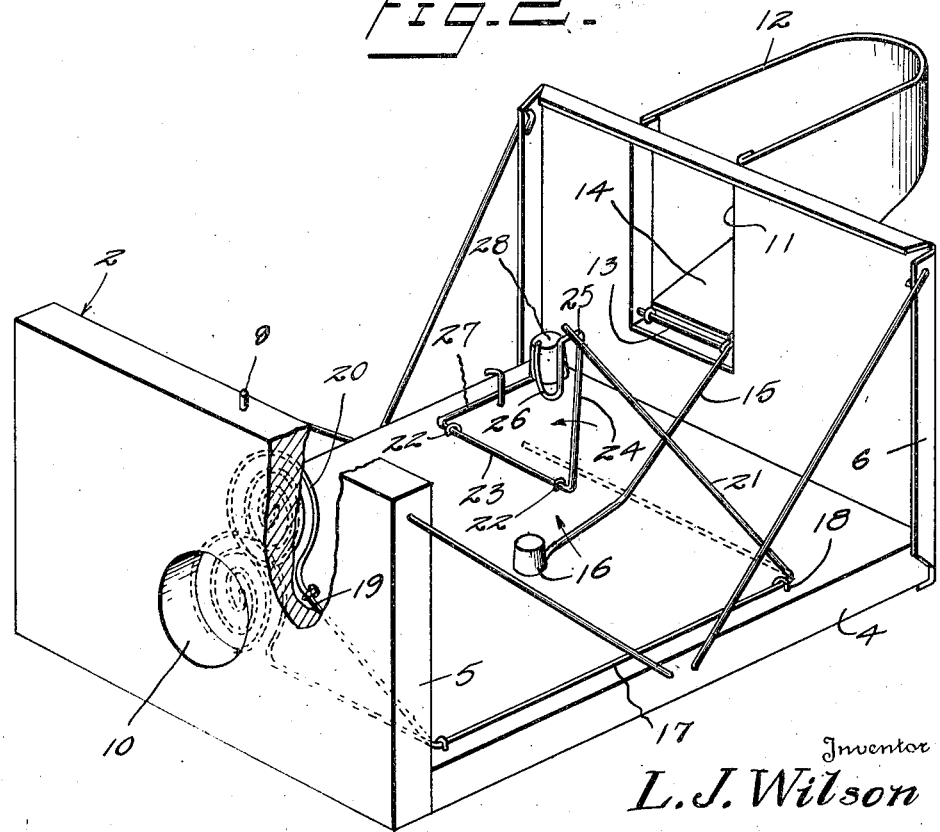
Inventor
L. J. Wilson
By Watson E. Coleman
Attorney Patented Mar. 8, 1938

2,110,517

UNITED STATES PATENT OFFICE 2,110,517

ANIMAL TRAP

Loran J. Wilson, Ben Hur, Va.

Application August 20, 1936, Serial No. 97,045

6 Claims. (Cl. 43—76)

This invention relates to the class of trapping and pertains particularly to improvements in animal operated traps.

The primary object of the present invention is to provide an improved trap for animals of the type of mice, rats, ground squirrels, or the like, and wherein the animal will be enticed into one chamber or compartment by a bait, where it will be trapped, and wherein means is provided to permit the animal to leave the first compartment and enter a second and in doing so re-set the trap so that a second animal may enter the first compartment.

Another object of the invention is to provide a novel trap unit which may be used in association with any type of cage or housing structure so that the unit can be transferred, if desired, from one structure to another.

A still further object of the invention is to provide in a trap of the above described character, a novel re-setting means actuated by a movable platform or treadle, which the trapped animal will operate in attempting to escape from one compartment of the trap.

A still further object of the invention is to provide in association with the re-setting means, a novel mechanism whereby a closure structure having an entrance opening of the trap will be moved to open position simultaneously with the re-setting of the trap latch mechanism.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view in longitudinal section thru a trap constructed in accordance with the present invention.

Figure 2 is a view in perspective of the mechanism unit of the trap removed from the housing cage.

Referring now more particularly to the drawing the numeral 1 generally designates the cage or other suitable type of housing forming a part of the present improved trap structure and in association with which the novel removable mechanism unit is employed, and illustrated in Figs. 1 and 2.

The cage or housing is here illustrated as being in the form of an elongated structure of relatively small mesh, strong woven wire. The structure is preferably of rectangular cross sectional design so that the removable unit portion thereof, which is indicated as a whole by the numeral 2, and illustrated in detail in Fig. 2, may snugly fit. It will, of course, be obvious that this cage or housing structure may be made of any other suitable material if found desirable.

The cage here illustrated is provided at one end with the closure wall 3 while the other end is open for the insertion of the unit 2. The unit 2 consists of a base or bottom 4, an upstanding front wall 5, and a back wall 6. These walls are of the same cross-sectional design as the cage 1 so that when the unit is placed in the cage in the manner shown in Fig. 1, the wall 5 will close the open end of the cage and the wall 6 will form a partition to divide the cage into a forward chamber 7 and a rear chamber 8. The top edge of the front wall 5 of the unit is preferably provided with a pin 9 for engagement in the meshes of the wire of the cage so as to secure the unit in position. This is merely one form of securing means which may be employed, and it is to be understood that the invention is not to be limited in this constructional detail as it will be obvious that other suitable securing means may be made use of.

The front wall 5 is provided with an animal entrance opening 10 and the wall 6 is provided with a door opening 11. Extending rearwardly from the wall 6 is a substantially U-shaped guard wall 12 which is arranged to have its open end across the door 11, and this guard wall is supported upon the wall 6 so that sufficient space is provided beneath it to allow an animal to drop down through the open bottom of the guard wall into the chambered area 8. The top edge of the wall 12 is in close proximity to the top wall of the cage 1 so that an animal passing from the chamber 7 into the chamber 8 through the door 11 must pass down from the lower part of the guard wall 12.

Extending transversely of the door-way 11 is a shaft 13 upon which is oscillatably mounted a platform 14 which closes the lower part of the area defined by the guard wall 12 as shown in Fig. 1. Attached to this platform 14 is an arm which extends downwardly and inwardly as indicated at 15, over the bottom 4 of the unit and the free end of this arm has a weight 16 secured thereto which normally maintains the platform in position to close the lower part of the guard wall structure.

Extending longitudinally of one side edge of the base 4 is a shaft 17 which is oscillatably maintained in place by the eyes 18, and one end of this shaft is turned to provide the arm 19 which extends across the inner face of the front wall 5 and carries upon its free end a gate or some other suitable type of closure structure which is indicated by the numeral 20 and which is adapted to drop by gravity into a position to cover the entrance opening 10. The opposite end of the shaft 17 is turned to extend inwardly and form a latch finger 21 which extends across the top of the platform arm 15.

Oscillatably secured by the eyes 22 to the base 4, to extend parallel with the rear wall 6, is a short shaft 23, one end of which is turned to extend vertically as indicated at 24. This vertical portion of the shaft 23 constitutes a trigger for maintaining the latch finger in raised position with respect to the base 4, and as is shown in Fig. 1, the trigger is normally inclined slightly toward the latter and has a horizontal upper end portion 25 upon which the free end of the finger 21 may rest. Integral with this horizontal portion 25 is a hook 26 for the support of bait, such as a piece of cheese.

At the other end of the short shaft 23 is a rightangularly extending weight arm 27 upon the free end of which a weight 28 is secured.

When the trigger 24 is oscillated forwardly or in the direction indicated by the arrow, the horizontal upper end 25 will slip from beneath the free end of the finger 21 and allow the latter to drop. This release of the finger 21 permits the shaft 17 to rock and also allows the gate 20 to fall into a position to close the entrance opening 10.

In the operation of the present trap, the trap is set by raising the finger 21 and this movement of the finger will cause it to ride up against the rear side of the rearwardly inclined trigger 24 so as to cause it to swing forwardly until the free end of the finger 21 is above the horizontal upper end of the trigger, whereupon the latter will oscillate rearwardly under the action of the weight 28 and the finger 21 may then rest upon the free end portion 25 of the trigger. This will maintain the entrance gate 20 in opened position.

When an animal enters the forward chamber 7 through the opening 10, it will attempt to remove the bait from the hook 26 and in doing so will pull upon the bait and oscillate the trigger 24 forwardly. This will release the finger 21 and allow the gate 20 to drop to closed position. As soon as the animal discovers that it is trapped, it will seek a way of escape and will enter the area enclosed by the guard 12, placing its weight upon the platform 14. When this occurs, the platform will swing downwardly and deposit the animal into the rear chamber 8 and at the same time it will raise the arm 15 under the finger 21 so as to raise the latter in a manner previously described until its free end again rises to a plane above the portion 25 of the trigger 24. This opens the gate 20 and also allows the trigger to again swing back into a position where it will maintain the free end of the finger 21 in raised position. Thus the animal in attempting to escape, in passing from the front compartment or chamber to the rear one, effectively traps itself in the second or rear compartment and re-sets the trap so that another animal may enter the front chamber and repeat the process.

While Fig. 1 shows the several parts in the approximate proportions in which they will be employed, it will be obvious that these proportions may be changed to suit the type of animal which the trap is designed to catch, therefore the invention is not to be confined to the exact proportions of the figures, or to the particular design or material of the cage or trap body.

What is claimed, is:

1. In a trap of the character described, a hollow trap body having two end walls, a partition dividing the trap body into two chambers, one of said end walls having an entrance opening therethrough, closure means for said entrance opening mounted for movement in a plane paralleling the inner side of the adjacent wall, means permitting the passage of an animal from the chamber into which the entrance opening leads into the other chamber through the partition wall and including an oscillatable platform, a trigger mechanism which when set maintains said closure means in open position relative to the entrance opening and having two separable parts, one of said parts being connected with said closure means, the said trigger parts when separated permitting gravitational closing of the closure means, and means actuated by the oscillation of said platform to re-set the trigger mechanism after the same has been sprung by bringing said parts into co-acting relation.

2. In a trap, a trap body having two end walls, a partition wall dividing the trap body into front and rear chambers, the end wall of the front chamber having an animal entrance opening therethrough, and said partition having a passage-way therethrough, an oscillatable closure for said entrance opening, a finger connected with said closure to move therewith, a trigger unit adapted to maintain said finger in one position when the closure is in opened position, the movement of said trigger permitting the trigger and the closure to move downwardly where the closure is in closed position, an oscillatable platform normally closing the passageway between the front and rear compartments, and an arm carried by the platform which when oscillated, with the platform re-sets said finger of the trigger and moves the closure to opened position.

3. In an animal trap, a trap body having two end walls, a partition wall dividing the body into front and rear chambers, the partition wall at the end of the front chamber having an entrance opening therethrough, said partition wall having a passage therethrough from the front to the rear chamber, a guard wall carried by the partition and extending therefrom into the rear chamber and forming an enclosed area into which said passage leads, the lower part of the guard wall opening into the rear chamber, a platform oscillatably mounted in the open part of the guard wall, a trigger mechanism including an oscillatable finger which is maintained in raised position when the trap is set, means for closing the entrance opening when the trigger finger is released, and an arm carried by the platform and extending into the front compartment beneath the trigger finger and adapted to raise the same to re-set the trigger mechanism when the platform is depressed.

4. A removable unit for a trap body, comprising a base having front and rear upstanding walls, said front wall having an animal entrance opening therethrough, said rear wall having an animal passage therethrough, a vertical guard wall carried by said rear wall and enclosing an area into which said passage opens, the lower part of the guard wall being opened and raised above the base of the unit, a platform oscillatably disposed in the lower part of said enclosed area, a weighted arm extending inwardly from the platform over the base, a shaft oscillatably mounted on the base and carrying a laterally extending finger and an arm, said arm being disposed rearwardly of the front wall, an entrance opening controlling the gate carried by the arm, a normally rearwardly inclined trigger member oscillatably mounted on said base and having an upper end portion adapted to support the free end of said finger in raised position, weight means normally maintaining the trigger in said rearwardly inclined position, and means for attaching a bait to the trigger, said trigger when oscillated in a direction to raise said weight releasing said finger and permitting the gate to move to closed position.

5. A trap, comprising a trap cage, an entrance chamber for the cage having front and inner walls each of which has an opening therethrough, a gravity-closed closure for the opening of the front wall, a vertically oscillated trigger finger connected with the closure and when raised maintaining the closure raised, an oscillatable trigger adapted to maintain said finger raised when the trap is set, a normally closed closure means for the opening of the inner wall which is adapted to be forced open by an animal attempting to pass into the cage, and means actuated by the opening of the last closure for raising and setting said finger on the trigger.

6. A trap, comprising a trap cage, an entrance chamber for the cage having front and inner walls each of which has an opening therethrough, a gravity-closed closure for the opening of the front wall, a vertically oscillated trigger finger connected with the closure and when raised maintaining the closure raised, a vertically disposed trigger member having a portion adapted to support said finger in raised position, an oscillatable treadle normally closing the opening leading into the cage and adapted to be oscillated to open position by an animal's weight thereon, and means carried by the treadle which, on oscillation of the latter after the trap is sprung, raises and replaces said finger on the said portion of the trigger.

LORAN J. WILSON.